United States Patent [19]

Morimoto

[11] Patent Number: 5,898,661
[45] Date of Patent: Apr. 27, 1999

[54] OPTICAL INFORMATION STORAGE UNIT

[75] Inventor: Yasuaki Morimoto, Kawasaki, Japan

[73] Assignee: Fujitsu Limited, Kawasaki, Japan

[21] Appl. No.: 09/045,303

[22] Filed: Mar. 20, 1998

[30] Foreign Application Priority Data

Oct. 6, 1997 [JP] Japan .................................. 9-272868

[51] Int. Cl.⁶ ............................ G11B 7/007; G11B 11/10
[52] U.S. Cl. ..................... 369/109; 369/13; 369/44.23; 369/110; 369/112
[58] Field of Search .................... 369/109, 110, 369/13, 44.23, 112

[56] References Cited

U.S. PATENT DOCUMENTS

| | | | |
|---|---|---|---|
| 5,519,685 | 5/1996 | Kato et al. | 369/110 |
| 5,784,347 | 7/1998 | Miyamoto et al. | 369/13 |

FOREIGN PATENT DOCUMENTS

| | | |
|---|---|---|
| 63-58629 | 3/1988 | Japan . |
| 3-157842 | 7/1991 | Japan . |
| 4-341930 | 11/1992 | Japan . |
| 7-85523 | 3/1995 | Japan . |
| 7-182713 | 7/1995 | Japan . |
| 7-192340 | 7/1995 | Japan . |
| 8-7357 | 1/1996 | Japan . |
| 8-221820 | 8/1996 | Japan . |
| 9-128825 | 5/1997 | Japan . |
| 9-161347 | 6/1997 | Japan . |

OTHER PUBLICATIONS

Current Status & Future of Magneto–Optical Disks, Nobutake Imamura, MO Disk, Japan, 21st Aug., 1996, pp. 54–55.

Primary Examiner—Tod R. Swann
Assistant Examiner—Kim-Kwok Chu
Attorney, Agent, or Firm—Greer, Burns & Crain, Ltd.

[57] ABSTRACT

An optical information storage unit for irradiating a light on a recording medium which has a recording surface with a land and a groove, and detecting a reproduced signal from a reflected light received from the recording medium, is constructed to include a first optical element separating the reflected light received from the recording medium into at least three bundles of rays, a second optical element compensating phases of the bundles of rays separated by the first optical element, and a third optical element detecting polarization states of the bundles of rays separated by the first optical element. An amount of phase compensation made by the second optical element is such that an absolute value of a difference between an amount of phase compensation required to reproduce a signal from the land and an amount of phase compensation required to reproduce a signal from the groove is greater than or equal to 60° but less than or equal to 180°.

12 Claims, 10 Drawing Sheets

OPTICAL INFORMATION STORAGE UNIT

BACKGROUND OF THE INVENTION

The present invention generally relates to optical information storage units, and more particularly to an optical information storage unit which is suited for a high density information recording and reproduction.

In this specification, an "information storage unit" refers to an apparatus which records information on and/or reproduces information from a recording medium.

Recently, there is much attention on a recording and reproducing technique which uses the near field when magneto-optically recording and reproducing information on and from a recording medium. Active research is made particularly in a technique which uses a solid immersion lens (hereinafter referred to as a solid immersion lens (SIL) technique), because the SIL technique can realize a super high density information recording and reproduction. The SIL technique itself is disclosed for example in "Current Status & Future of Magneto-Optical Disks" by Nobutake Imamura, MO DISK, Japan, Aug. 21, 1996, pp.54–55.

FIG. 1 is a cross sectional view for explaining the operating principle of the SIL technique. In FIG. 1, a bundle of rays emitted from a light source (not shown) is once converted into parallel rays by a collimator lens (not shown) or, is converted into a convergent spherical wave by a non-aberration lens 105 which can converge the bundle of rays to a diffraction limit in a state of a direct divergent light. The convergent spherical wave is incident to a spherical surface side of a hemispherical lens 106 which is made of a material having a large refractive index, and converges on a surface cut along a equatorial plane of the hemispherical lens 106.

A magneto-optic recording medium 107 is made up of a substrate 107a, a magneto-optic recording layer 107b, and a protection layer 107c. A gap between the hemispherical lens 106 and the magneto-optic recording layer 107b is maintained less than or equal to a wavelength of the bundle of rays irradiated due to an air flow. Because the refractive index of the hemispherical lens 106 is extremely large, a large portion of the bundle of rays undergoes a total reflection if no object exists in a vicinity of the convergent surface. However, if an object exists in the vicinity of the convergent surface, the bundle of rays is radiated due to an evanescent wave coupling.

A spot size of a light beam at an emission surface of the hemispherical lens 106 is inversely proportional to a product of the refractive index and a numerical aperture (NA) of the non-aberration lens 105. In other words, the larger both the refractive index and the NA are, the smaller the spot size of the light beam. For example, if the refractive index is 2, the spot size of the light beam becomes one-half by the provision of the hemispherical lens 106 as compared to a case where only the non-aberration lens 106 having the same NA is provided.

As described above, the SIL technique is an extremely important technique for realizing the super high density information recording and reproduction. For this reason, in order to further improve the recording density, it is desirable to apply the SIL technique to a magneto-optic recording medium having a land and a groove to be recorded with information.

When recording the information on the land, the groove exists between two adjacent lands, and the generation of a crosstalk in which the information recorded on the adjacent land mixes into the reproduced information is suppressed because the lands recorded with the information are separated from each other. Similarly, when recording the information on the groove, the land exists between two adjacent grooves, and the generation of a crosstalk in which the information recorded on the adjacent groove mixes into the reproduced information is suppressed because the grooves recorded with the information are separated from each other.

However, when recording the information on both the land and the groove, information recording regions become contiguous and the generation of the crosstalk from the contiguous recording regions is unavoidable, thereby greatly affecting the information reproducing characteristic.

A method of reducing the crosstalk from the land or the groove by appropriately setting a depth of the groove has been proposed in a Japanese Laid-Open Patent Application No.8-7357, for example. According to this proposed method, in a case where the wavelength of the light beam is 680 nm, the NA of an objective lens used is 0.55 and the widths of the land and the groove are 0.7 $\mu$m, the crosstalk is reduced by setting the depth of the groove to approximately 1/6 the wavelength.

But even if the spot size of the light beam irradiated on the recording surface of the magneto-optic recording medium is the same, as the track pitch becomes narrower by the use of the SIL technique described above, there was a problem in that the crosstalk cannot be reduced sufficiently in the case of a groove having the depth on the order of approximately 1/6 the wavelength. In addition, compared to the normal case where the depth of the groove of the magneto-optic recording medium is 1/8 the wavelength, there also were problems in that a carrier level of the signal decreases and a level of a push-pull signal which is used as a tracking error signal also decreases in the case of the groove having the depth on the order of approximately 1/6 the wavelength.

On the other hand, it has been reported that the condition for reducing the crosstalk in the proposed method, that is, the setting of the depth of the groove of the magneto-optic recording medium, easily changes depending on the Kerr ellipticity, spherical aberration and focal error of the objective lens, and the like.

Furthermore, a Japanese Laid-Open Patent Application No.9-128825, for example, proposes a method of reducing the crosstalk by setting the width of the land approximately the same as the width of the groove having an optical depth of approximately 1/8 the wavelength when recording the information on the land and the groove of the magneto-optic recording medium. But in this case, it is necessary to provide two read channels, namely, a read channel for reproducing the signal from the land and a read channel for reproducing the signal from the groove, and it is also necessary to provide a plurality of wave plates and prisms or the like for separating the bundle of rays. Consequently, there was a problem in that the optical information storage apparatus according to this proposed method becomes expensive.

On the other hand, even in the case where the information is recorded on the land or the groove of the magneto-optic recording medium, a reflected light component from the adjacent groove or land increases thereby introducing a phase error as the track pitch is further reduced by employing the SIL technique. As a result, there was a problem in that the information cannot be reproduced satisfactorily from the magneto-optic recording medium because the polarized state changes due to the phase error.

SUMMARY OF THE INVENTION

Accordingly, it is a general object of the present invention to provide a novel and useful optical information storage unit in which the problems described above are eliminated.

Another and more specific object of the present invention to provide an optical information storage unit which can reduce a crosstalk from an adjacent track on a recording medium by use of a relatively simple and inexpensive optical system, and is capable of satisfactorily reproducing information from the recording medium.

Still another object of the present invention is to provide an optical information storage unit for irradiating a light on a recording medium which has a recording surface with a land and a groove, and detecting a reproduced signal from a reflected light received from the recording medium, comprising a first optical element separating the reflected light received from the recording medium into at least three bundles of rays, a second optical element compensating phases of the bundles of rays separated by the first optical element, and a third optical element detecting polarization states of the bundles of rays separated by the first optical element, where an amount of phase compensation made by the second optical element is such that an absolute value of a difference between an amount of phase compensation required to reproduce a signal from the land and an amount of phase compensation required to reproduce a signal from the groove is greater than or equal to 60° but less than or equal to 180°. According to the optical information storage unit of the present invention, it is possible to realize an optical information storage unit which can reduce a crosstalk from an adjacent track on a recording medium by use of a relatively simple and inexpensive optical system, and is capable of satisfactorily reproducing information from the recording medium.

Other objects and further features of the present invention will be apparent from the following detailed description when read in conjunction with the accompanying drawings.

DESCRIPTION OF THE PREFERRED EMBODIMENTS

Figure 1:
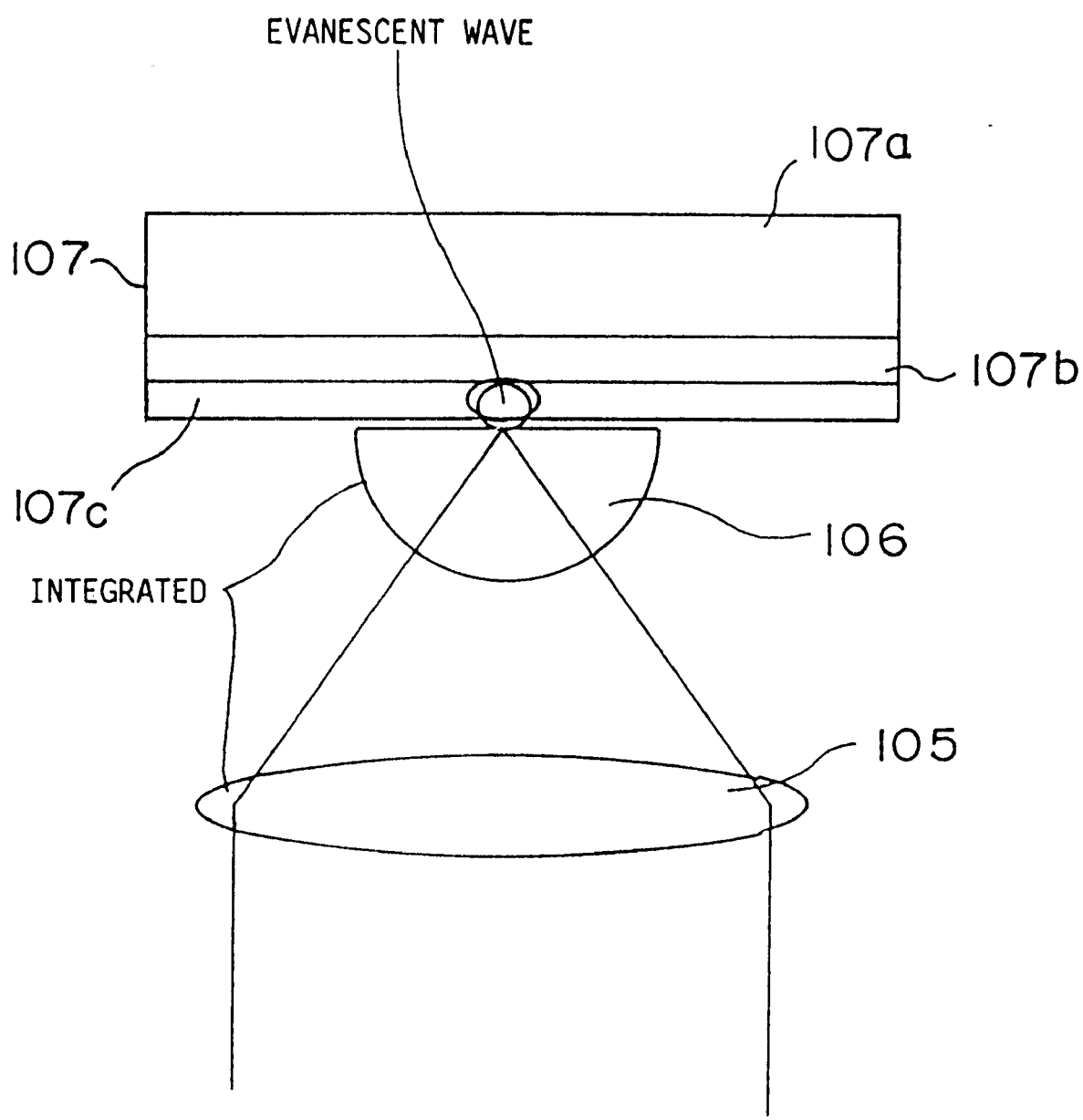
FIG. 1 is a cross sectional view for explaining the operating principle of a SIL technique.
Figure 2:
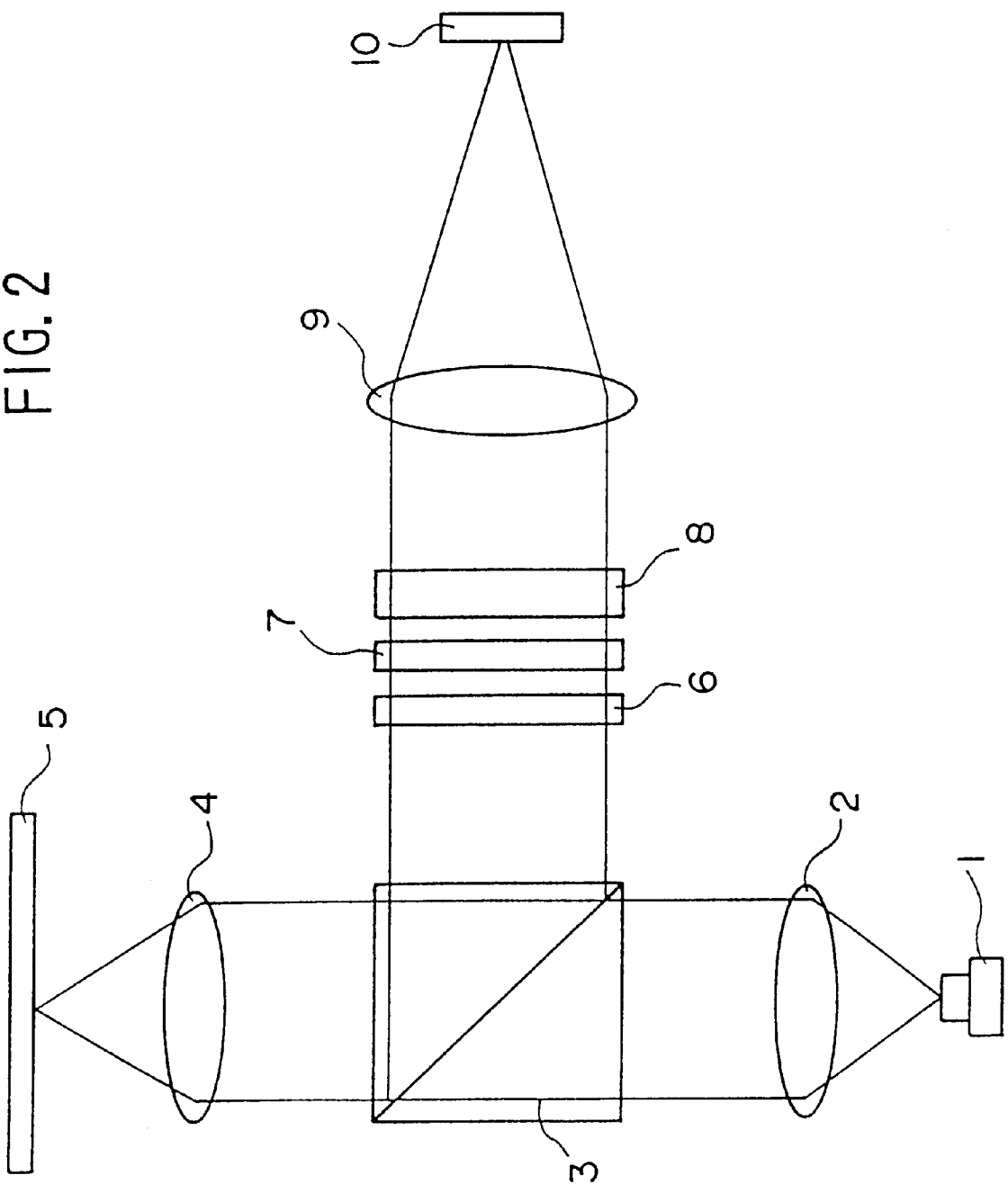
FIG. 2 is a diagram showing the general construction of a first embodiment of an optical information storage unit according to the present invention.

FIG. 2 is a diagram showing the general construction of a first embodiment of an optical information storage unit according to the present invention. In FIG. 2, a bundle o rays emitted from a semiconductor laser 1 is converted into parallel rays by a collimator lens 2, and becomes incident to a polarization beam splitter 3 in a state where an electrical vector is parallel to the paper. Transmittances Tp and Ts of the polarization beam splitter 3 with respect to P-polarized light component and S-polarized light component and reflectivities Rp and Rs of the polarization beam splitter 3 with respect to the P-polarized light component and the S-polarized light components are respectively set to satisfy Tp:Rp=80:20 and Ts:Rs=2:98. The bundle of rays transmitted through the polarization beam splitter 3 is converged to the diffraction limit by an objective lens 4, and is irradiated on a land and a groove forming tracks on a recording surface of a magneto-optic disk 5. When the bundle of rays is irradiated on the recording surface of the magneto-optic disk 5, magnetic domains are recorded on the track formed on the recording surface or, magnetic domains on the track are reproduced. The bundle of rays reflected by the magneto-optic disk 5 again passes through the objective lens 4, and becomes incident to the polarization beam splitter 3. The bundle of rays incident to the polarization beam splitter 3 is reflected according to a polarization reflection characteristic and is directed towards a magneto-optic signal detection optical system.

The bundle of rays directed towards the magneto-optic signal detection optical system is separated into a plurality of bundles of rays by a diffraction grating 6. Out of the bundles of rays separated by the diffraction grating 6, a 0th order light and ±1st order lights are used to detect a magneto-optic signal. A diffraction efficiency of the diffraction grating 6 is set so that a sum of the amounts of light of the ±1st order lights is approximately equal to the amount of light of the 0th order light, and a sum total of the amounts of light of the 0th order light and the ±1st order lights is 90% of the total amount of light or greater.

The bundles of rays separated by the diffraction grating 6 become incident to a wave plate 7. Out of the bundles of rays separated by the diffraction grating 6, the 0th order light becomes incident approximately perpendicularly to the wave plate 7, while the ±1st order lights become incident to the wave plate 7 with an angle of diffraction dependent on the grating pitch of the diffraction grating 6. The bundles of rays passing through the wave plate 7 reach a Wollaston prism 8 where a polarized light detection takes place and the P-polarized light component and the S-polarized light component are separated. The P-polarized light component and the S-polarized light component are irradiated on a photodetector 10 via a convergent lens 9, and a photoelectric conversion takes place in the photodetector 10.

The Wollaston prism 8 is made up of parallelepiped or cube shaped crystal blocks which are connected to each other at a plane where the optical axes of the two crystals form an angle with respect to an incident surface thereof. Since the Wollaston prism 8 is adjusted to an infinite focal point, the blocks may be fixed by bonding after the adjustment.

Figure 3:
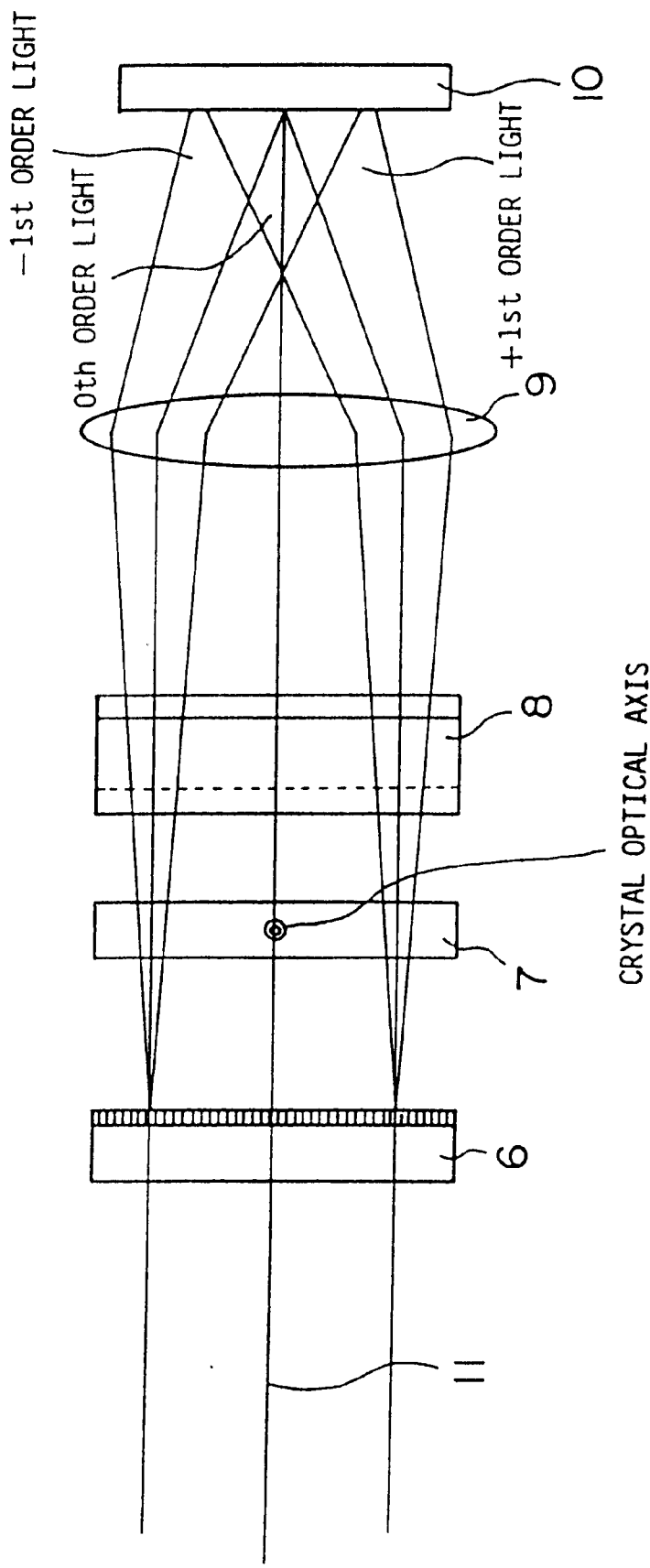
FIG. 3 is a diagram on an enlarged scale showing an optical system in a stage subsequent to a diffraction grating shown in FIG. 2.
Figure 4:
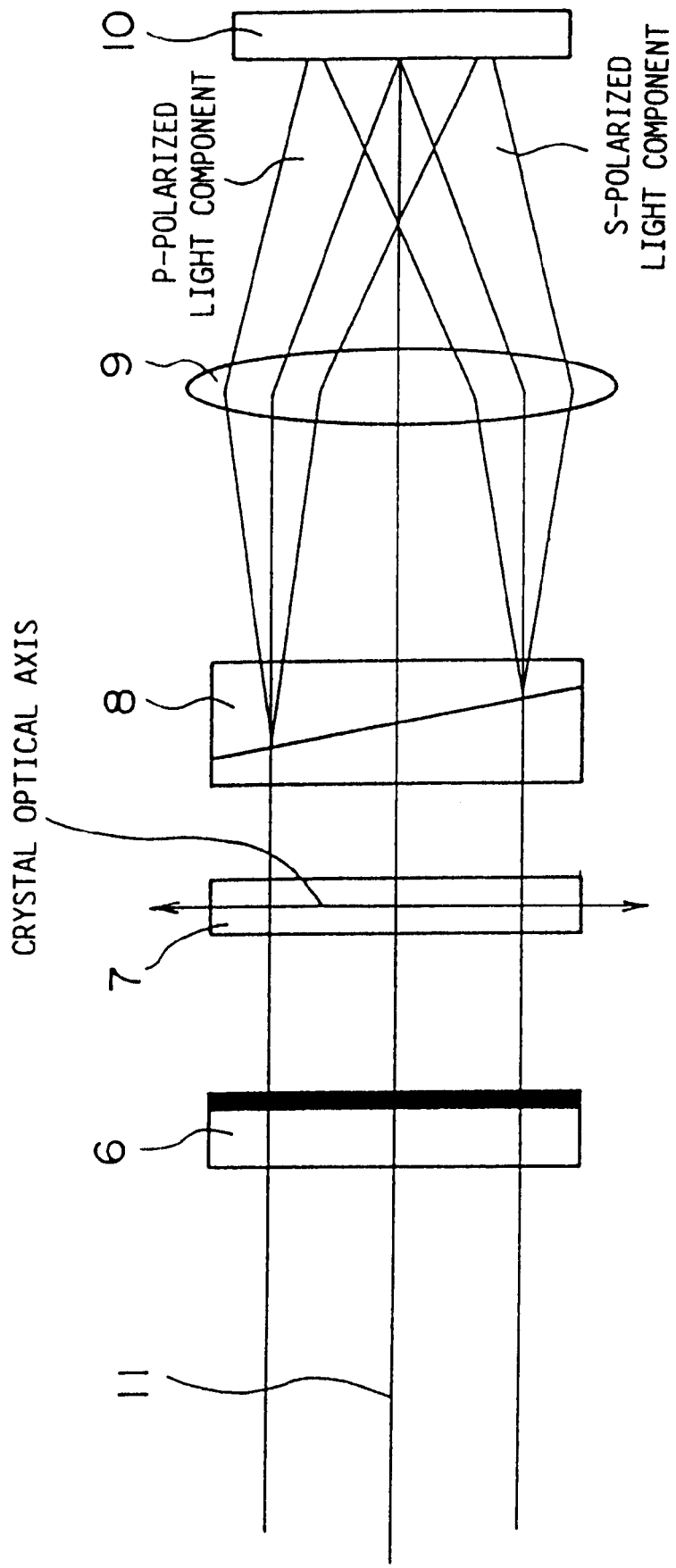
FIG. 4 is a diagram on an enlarged scale showing the optical system in the stage subsequent to the diffraction grating shown in FIG. 2.

FIGS. 3 and 4 respectively are diagrams on an enlarged scale showing the optical system in a stage subsequent to the diffraction grating 6 shown in FIG. 2. First, a description will be given of the separation of the bundle of rays by the diffraction grating 6, by referring to FIG. 3.

In FIG. 3, out of the bundles of rays separated by the diffraction grating 6, it is assumed that the 0th order light is used to reproduce the signal from the groove of the magneto-optic disk 5 and the ±1st order lights are used to reproduce the signal from the land of the magneto-optic disk 5. In this embodiment, the 0th order light becomes incident approximately perpendicularly to the wave plate 7, so as to introduce a phase error that is determined by the thickness of the wave plate 7 and is necessary to reproduce the signal from the groove. In this case, the phase error introduced to the 0th order light by the wave plate 7 can be described by (N·λ/2–C), where C denotes an absolute value of an amount of phase compensation required to reproduce the signal from the groove, λ denotes a wavelength of the bundle of rays, and N is an integer greater than or equal to one.

On the other hand, the ±1st order lights are separated symmetrically with respect to the 0th order light at an angle determined by the grating pitch of the diffraction grating 6. In other words, the ±1st order lights become obliquely incident to the wave plate 7. For this reason, the ±1st order lights become incident to the wave plate 7 as if the wave plate 7 is rotating rightwards or leftwards relative to the crystal optical axis. As a result, an optical distance of the ±1st order lights passing through the wave plate 7 becomes long, and a large phase error can be obtained totally without affecting the velocity of the ordinary and extraordinary rays. For example, in a case where the wavelength λ is 680 nm, the numerical aperture (NA) of the objective lens 4 is 0.55, the widths of the land and the groove of the magneto-optic disk 5 are 0.7 μm, and the optical depth of the groove is approximately λ/8, a phase error on the order of ±30° is required as the amount of phase compensation. In this case, the phase error introduced by the wave plate 7 with respect to the 0th order light is (N·λ/2–C), and the phase error with respect to the ±1st order lights for a case where N=2 can be described by angle of 330°.

In this embodiment, the amount of phase compensation by the wave plate 7 is set so that an absolute value of a difference between the amount of phase compensation required to reproduce the signal from the land of the magneto-optic disk 5 and the amount of phase compensation required to reproduce the signal from the groove of the magneto-optic disk 5 is greater than or equal to 60° but is less that or equal to 180°.

Next, a description will be given of the reason why the phase error introduced to the bundle of rays by the wave plate 7 is set to (N·λ/2–C).

For example, a λ/2 wave plate has a function of rotating the polarization plane of the bundle of rays about the crystal optical axis as an axis of symmetry, but the amount of phase compensation that is required is completely unaffected even if the λ/2 wave plate is provided in place of the wave plate 7. In other words, since a phase error corresponding to 0 and a multiple of λ/2 is always used as a reference, it is sufficient to provide the wave plate 7 having a thickness such that, with respect to the bundle of rays such as the 0th order light which is incident perpendicularly to the wave plate 7, a phase error that is introduced is a difference obtained by subtracting the amount of phase compensation required from the multiple of λ/2. On the other hand, since the amount of phase compensation required for the ±1st order lights is 30°, the phase error which is required to make an oblique output with respect to the wave plate 7 becomes 390°. Accordingly, the distance of the ±1st order lights passing through the wave plate 7 must be set approximately 1.182 times the distance of the 0th order light passing through the wave plate 7.

In a case where the wave plate 7 is made of a crystal, an average refractive index is approximately 1.55, and an angle of refraction which makes the optical length 1.182 times longer is approximately 32.2°. Hence, the incident angle of the ±1s order lights incident to the wave plate 7 must be 55.6° in this case. In other words, the grating pitch of the diffraction grating 6 becomes approximately 0.84 μm. The grating pitch of this diffraction grating 6 can be made larger by making the multiplying coefficient N larger. For example, in a case where N=4, the grating pitch of the diffraction grating 6 becomes 1.12 μm. Hence, the grating pitch can be made infinitely large by using the wave plate 7 of a multiple order.

Effects similar to those described above are also obtainable when, out of the bundles of rays separated by the diffraction grating 6, the 0th order light is used to reproduce the signal from the land and the ±1st order lights are used to reproduce the signal from the groove. But in this case, it is necessary to rotate the diffraction grating 6 and the wave plate 7 by 90° with respect to an optical axis 11 of the optical system.

Next, a description will be given of the polarization detection and separation of each bundle of rays by the Wollaston prism 8, by referring to FIG. 4.

In FIG. 4, a direction in which the diffraction grating 6 separates the bundle of rays by the diffraction phenomenon and a direction in which the Wollaston prism 8 separates the bundle of rays by the polarization characteristic are perpendicular to each other. An angle formed by the crystal optical axes of the two prisms forming the Wollaston prism 8 is set smaller than 90°, and the Wollaston prism 8 separates each of the 0th order light and the ±1st order lights received from the wave plate 7 into a plurality of bundles of rays.

Figure 5:
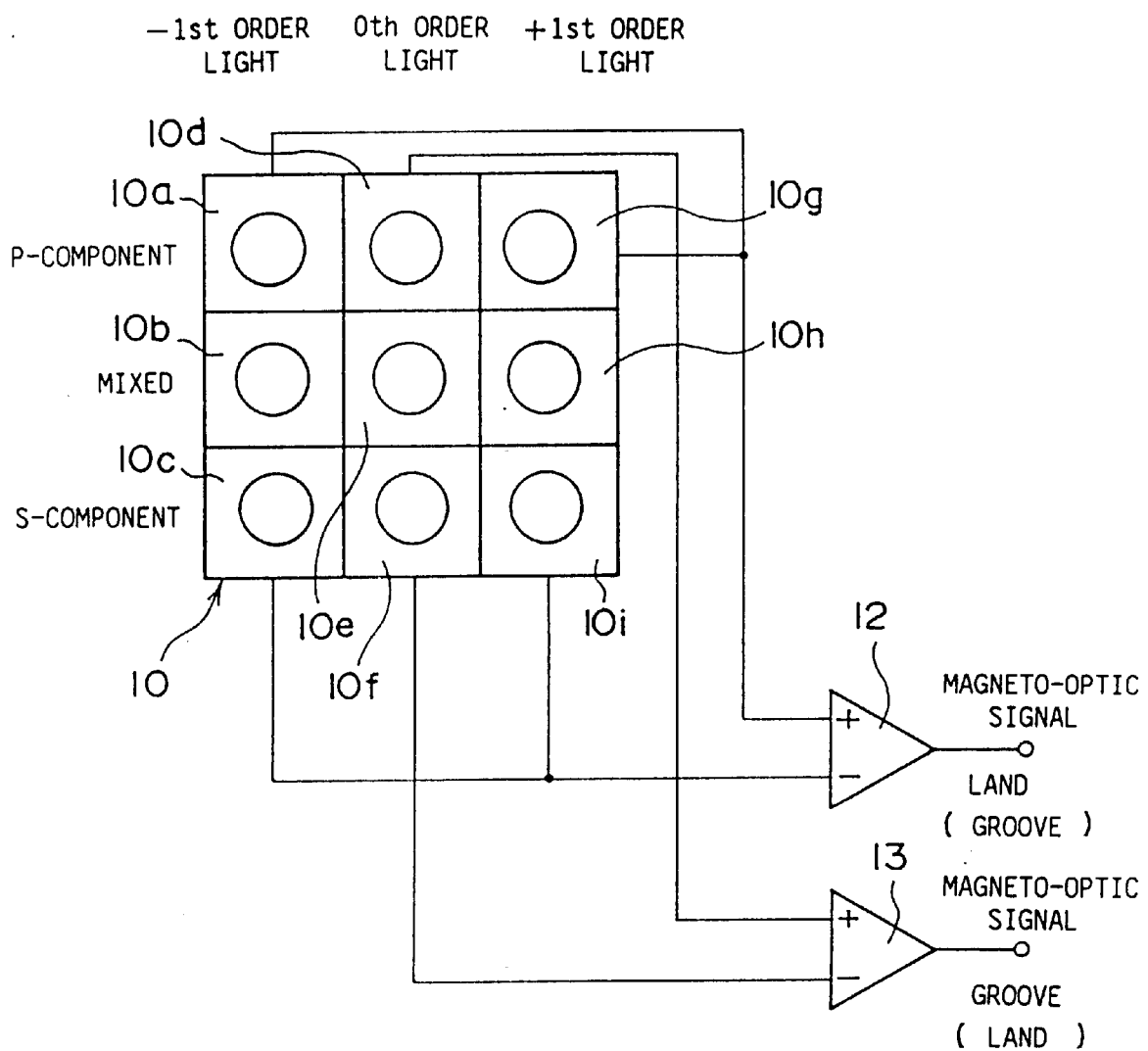
FIG. 5 is a diagram is a diagram showing a state of the bundles of rays converged on a photodetector when bundles of rays received via a wave plate are respectively separated into three bundles of rays by a Wollaston prism.

FIG. 5 is a diagram showing a state of the bundles of rays converged on the photodetector 10 when the 0th order light and the ±1st order lights received via the wave plate 7 are respectively separated into three bundles of rays by the Wollaston prism 8. In this case, the Wollaston prism 8 separates the 0th order light into three bundles of rays, the –1st order light into three bundles of rays, and the +1st order light into three bundles of rays, so that a total of nine bundles of rays are converged by the convergent lens 9. The nine bundles of rays converged by the convergent lens 9 are converged on corresponding detector parts 10a through 10i of the photodetector 10 in the form of spots of light beams, and are subjected to the photoelectric conversion.

More particularly, out of the three bundles of rays separated from the –1st order light, the P-polarized light component is converged on the detector part 10a, a mixed component made up of a mixture of the P-polarized light component and the S-polarized light component is converged on the detector part 10b, and the S-polarized light component is converged on the detector part 10c. Out of the three bundles of rays separated from the 0th order light, the P-polarized light component is converged on the detector part 10d, a mixed component made up of a mixture of the P-polarized light component and the S-polarized light component is converged on the detector part 10e, and the S-polarized light component is converged on the detector part 10f. In addition, out of the three bundles of rays separated from the +1st order light, the P-polarized light component is converged on the detector part 10g, a mixed component made up of a mixture of the P-polarized light component and the S-polarized light component is converged on the detector part 10h, and the S-polarized light component is converged on the detector part 10i.

A differential amplifier 12 differentially amplifies a sum of the P-polarized light components of the ±1st order lights obtained from the detector parts 10a and 10g and a sum of the S-polarized light components of the ±1st order lights obtained from the detector parts 10c and 10i, and outputs a magneto-optic signal which is reproduced from the land (or groove). On the other hand, a differential amplifier 13 differentially amplifies the P-polarized light component of the 0th order light obtained from the detector part 10d and the S-polarized light component of the 0th order light obtained from the detector part 10f, and outputs a magneto-optic signal which is reproduced from the groove (or land).

The mixed components made up of the mixture of the P-polarized light components and the S-polarized light components of the 0th order light and the ±1st order lights, which are obtained from the detector parts 10e, 10b and 10h, are used to generate a focal error signal and a tracking error signal. For example, by combining the convergent lens 9 and a cylindrical lens (not shown) in FIG. 4, it is possible to generate the focal error signal by a known means using the astigmatism method.

Figure 6:
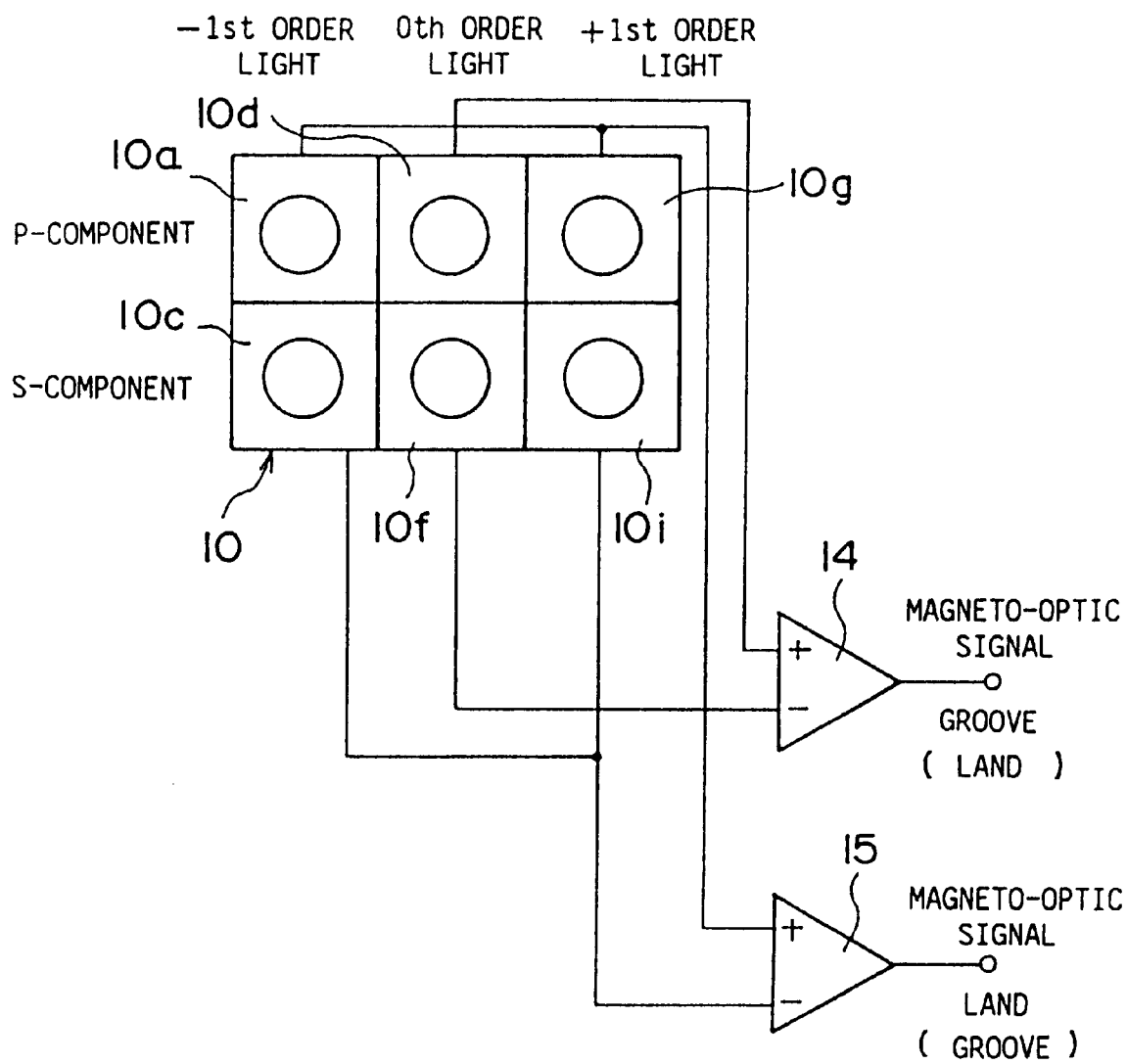
FIG. 6 is a diagram is a diagram showing a state of the bundles of rays converged on the photodetector when bundles of rays received via the wave plate are respectively separated into two bundles of rays by a Wollaston prism.

FIG. 6 is a diagram showing a state of the bundles of rays converged on the photodetector 10 when the 0th order light and the ±1st order lights obtained via the wave plate 7 are respectively separated into two bundles of rays of the P-polarized light component and the S-polarized light component by the Wollaston prism 8. In this case, the Wollaston prism 8 separates the 0th order light into two bundles of rays, the −1st order light into two bundles of rays, and the +1st order light into two bundles of rays, so that a total of six bundles of rays are converged by the convergent lens 9. The six bundles of rays converged by the convergent lens 9 are converged on corresponding detector parts 10a, 10c, 10d, 10f, 10g and 10i of the photodetector 10 in the form of spots of the light beams, and are subjected to the photoelectric conversion.

More particularly, out of the two bundles of rays separated from the −1st order light, the P-polarized light component is converged on the detector part 10a and the S-polarized light component is converged on the detector part 10c. Out of the two bundles of rays separated from the 0th order light, the P-polarized light component is converged on the detector part 10d and the S-polarized light component is converged on the detector part 10f. In addition, out of the two bundles of rays separated from the +1st order light, the P-polarized light component is converged on the detector part 10g and the S-polarized light component is converged on the detector part 10i.

A differential amplifier 15 differentially amplifies a sum of the P-polarized light components of the ±1st order lights obtained from the detector parts 10a and 10g and a sum of the S-polarized light components of the ±1st order lights obtained from the detector parts 10c and 10i, and outputs a magneto-optic signal which is reproduced from the land (or groove. On the other hand, a differential amplifier 14 differentially amplifies the P-polarized light component of the 0th order light obtained from the detector part 10d and the S-polarized light component of the 0th order light obtained from the detector part 10f, and outputs a magneto-optic signal which is reproduced from the groove (or land).

Next, a description will be given of a signal characteristic for a case where a signal is recorded on and reproduced from the magneto-optic disk 5 according to this embodiment. For the sake of convenience, it is assumed that the wavelength of the bundle of rays emitted from the semiconductor laser 1 is 680 nm, the NA of the objective lens 4 is 0.55, the widths of the land and the groove in the radial direction of the magneto-optic disk 5 are 0.7 $\mu$m, and the optical depth of the groove is $\lambda/8$.

Figure 7:
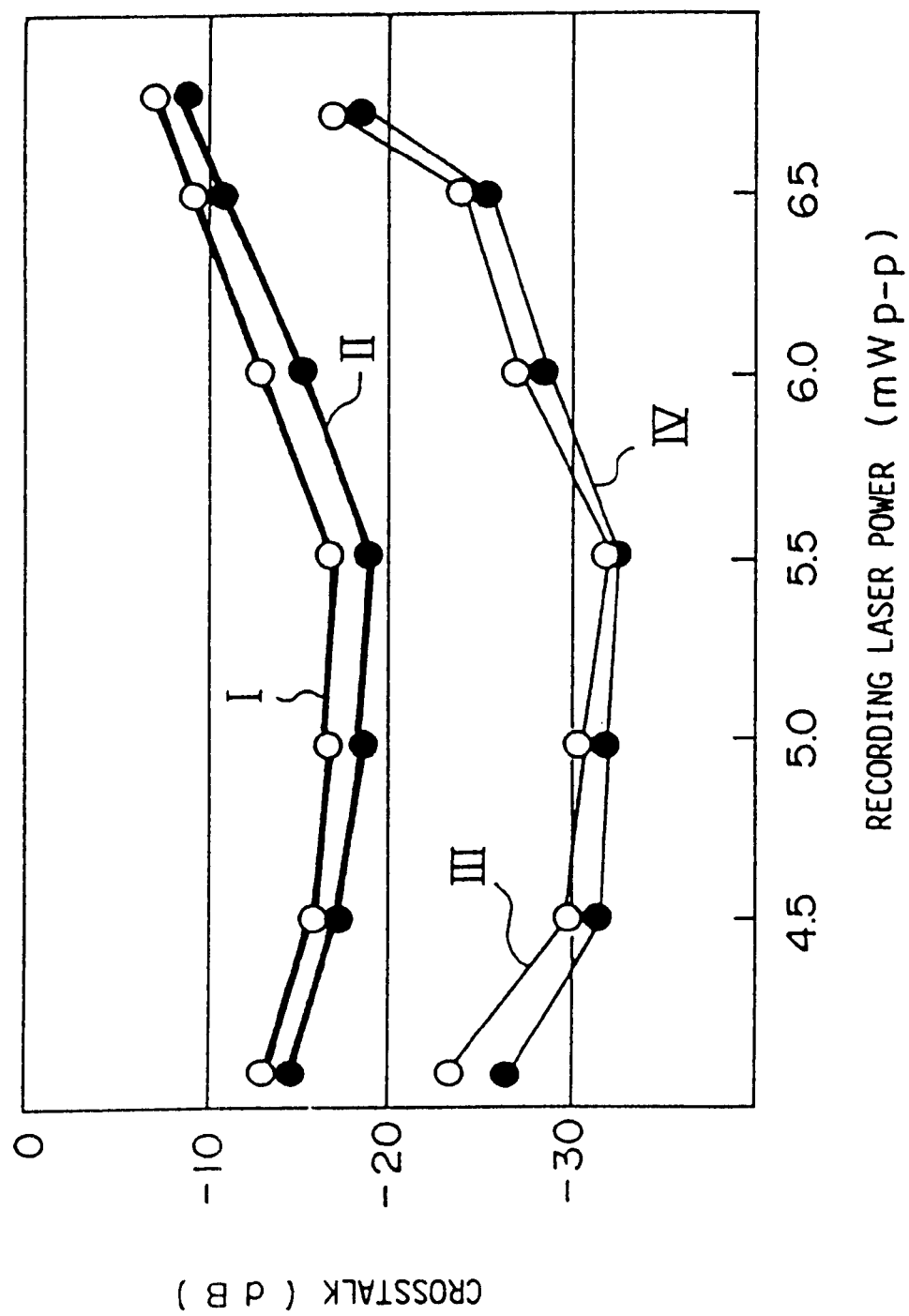
FIG. 7 is a diagram showing measured results of a recording laser power dependency of a crosstalk from an adjacent track.

First, a mark having a mark length of 2 $\mu$m was recorded on the land (or groove) of the magneto-optic disk 5, and a carrier level Cm was measured. In addition, the two grooves (or two lands) which are adjacent to the above described land (or groove) were reproduced, and a crosstalk Ct=Cm−Camax was obtained by denoting the higher carrier level of the two by Camax. FIG. 7 shows measured results of a recording laser power dependency of the crosstalk from the adjacent track obtained in this manner. In FIG. 7, a white circular mark indicates the crosstalk from the land, and a black circular mark indicates the crosstalk from the groove. In addition, characteristics I and II indicate characteristic which are obtained when no phase compensation is made, and characteristics III and IV indicate characteristics which are obtained when the phase compensation is made as in this embodiment.

As shown in FIG. 7, both the crosstalks from the land and the groove are −25 dB or less in a wide recording laser power range. In addition, since the optical depth of the groove of the magneto-optic disk 5 is $\lambda/8$, the amount of phase compensation which makes the crosstalk a minimum and the amount of phase compensation which makes a narrow band signal-to-noise ratio (or carrier-to-noise ratio (CNR) a maximum match when the signals are recorded on and reproduced from the land and the groove. In other words, the amount of phase compensation which makes the CNR a maximum and the crosstalk a minimum is the same for the case where the signal is reproduced from the land and for the case where the signal is reproduced from the groove.

Figure 8:
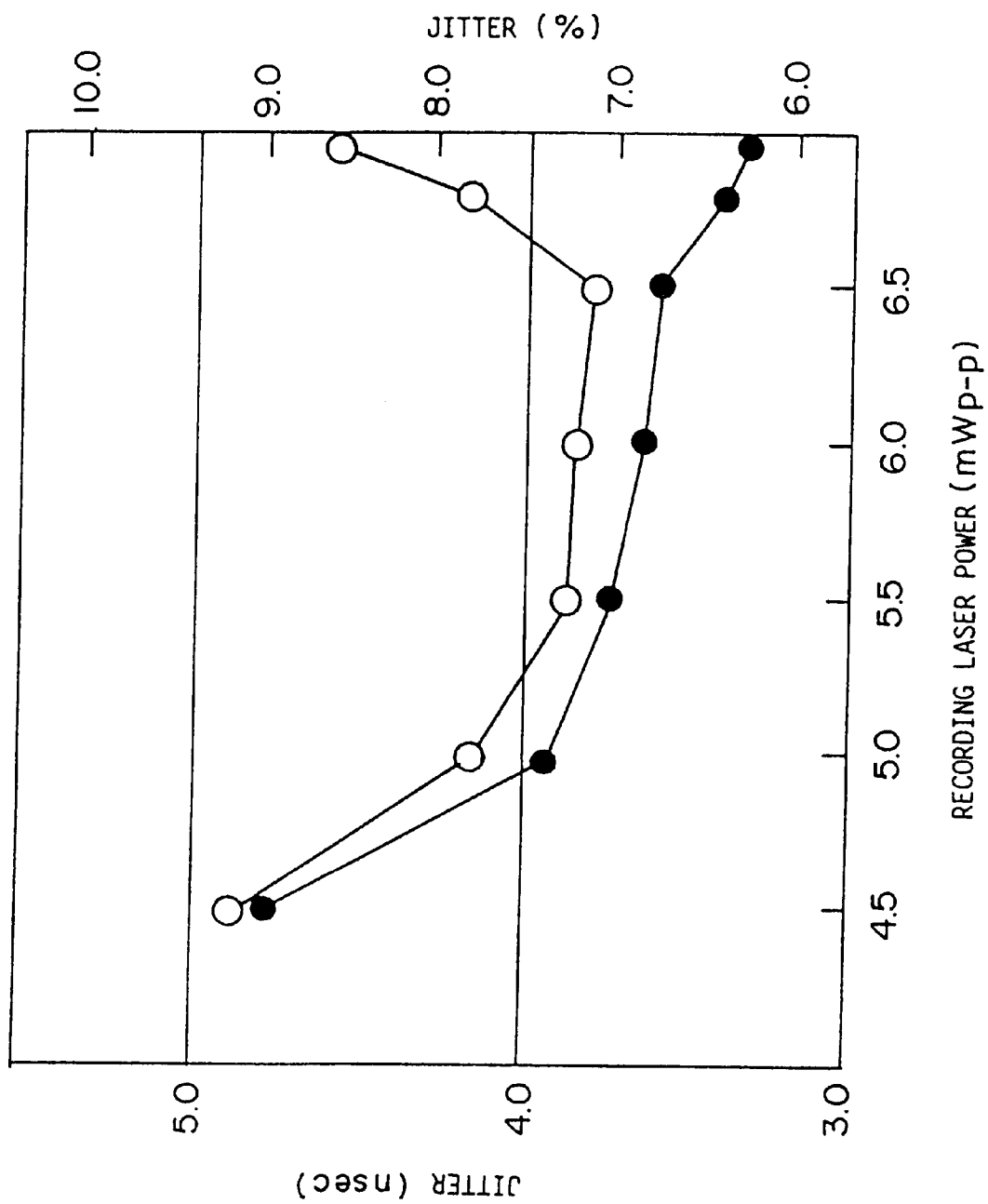
FIG. 8 is a diagram showing measured results of a recording laser power dependency of a 2T jitter.

Next, a random signal having a length 2T=0.48 $\mu$m which is a minimum mark length in the RLL1-7 (RLL: run length limited) code was recorded on the magneto-optic disk 5 at a linear velocity of 4.5 m/sec according to the pulse assist magnetic field modulation system, and then reproduced at a reproducing laser power of 1.3 mW. FIG. 8 shows measured results of the recording laser power dependency of the 2T-jitter obtained in this manner. In FIG. 8, a white circular mark indicates the jitter from the land, and a black circular mark indicates the jitter from the groove. The jitter in this case is defined as a value (%) which is obtained by multiplying 100 to a ratio of a standard deviation σ2T (data to data) of the 2T signal with respect to a predetermined window width (time). In addition, the reproducing laser power refers to the laser power when the light is output from the objective lens 4. As a result, a reproduced output corresponding to 0.65 mW was obtained from both the land and the groove.

As shown in FIG. 8, when the signal was recorded on both the land and the groove of the magneto-optic disk 5 and then reproduced, it was confirmed that the jitter is 9% or less in a wide recording laser power range and that a large margin can be secured with respect to the jitter. Generally, if an average jitter between a clock and the data is 12% or less, it is judged that the jitter is within a sufficiently tolerable range for the data recording and reproduction. There is a relationship between $\sigma_{dd}$ (data to data) and $\sigma_{cd}$ (clock to data) of that $\sigma_{dd}$ is equal to $\sqrt{2} \times \sigma_{cd}$. In this embodiment, even though the evaluation is made with respect to the jitter of 2T which is the minimum mark length, a satisfactory result in which the jitter is 9% or less was obtained, and it was therefore confirmed that the data recording and reproduction is completely unaffected by the jitter from the practical point of view.

When no phase compensation is made, the crosstalk between the tracks is −20 dB or greater and is extremely large as may be seen from the characteristics I and II shown in FIG. 7. For this reason, when reproducing the signal from the land and the groove in this case, it was impossible to realize a jitter of 12% or less at any recording laser power.

On the other hand, although this embodiment is provided with a read channel for reproducing the signal from the land of the magneto-optic disk 5 and a read channel for reproducing the signal from the groove of the magneto-optic disk 5, no inconveniences such as the reduction of the signal level and an insufficient CNR are introduced because the phase compensation is made, and it is possible to greatly improve the signal quality when recording and reproducing the signal on and from the magneto-optic disk 5.

Figure 9:
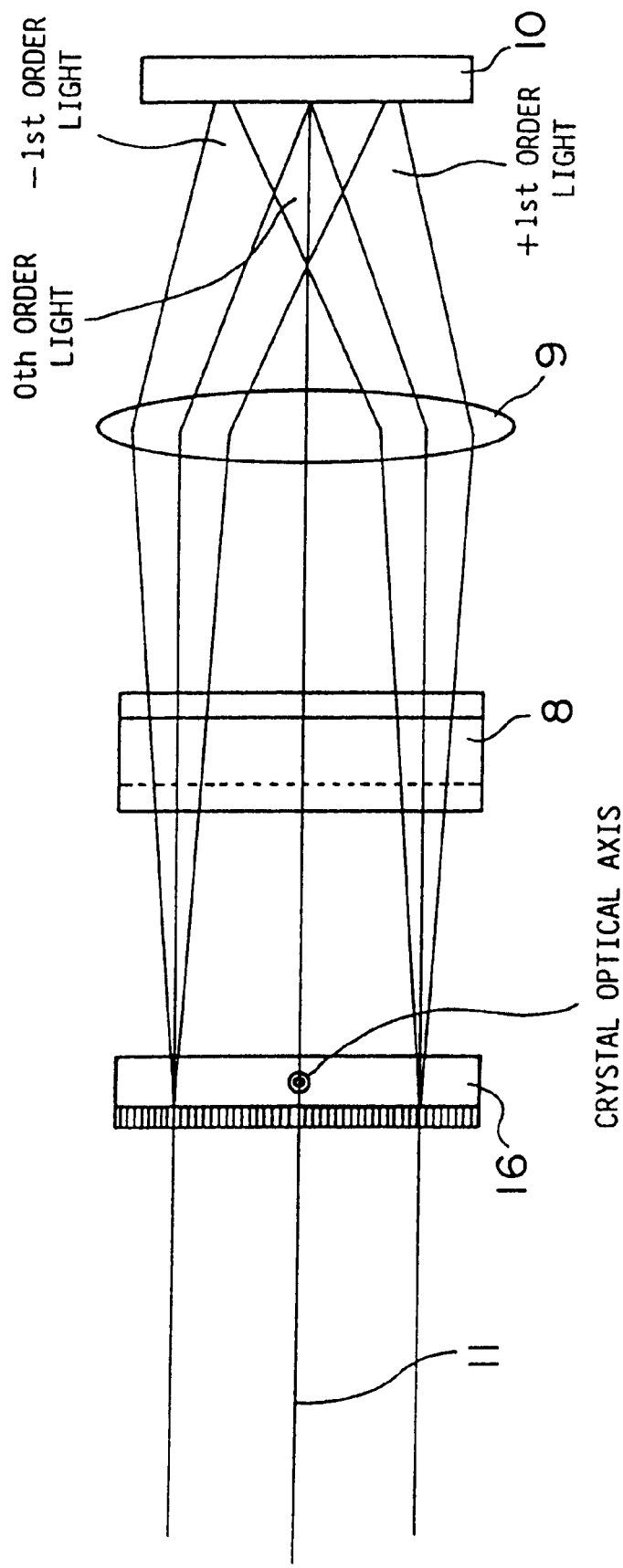
FIG. 9 is a diagram showing an important part of a second embodiment of the optical information storage unit according to the present invention viewed from a direction along a crystal optical axis of a wave plate.
Figure 10:
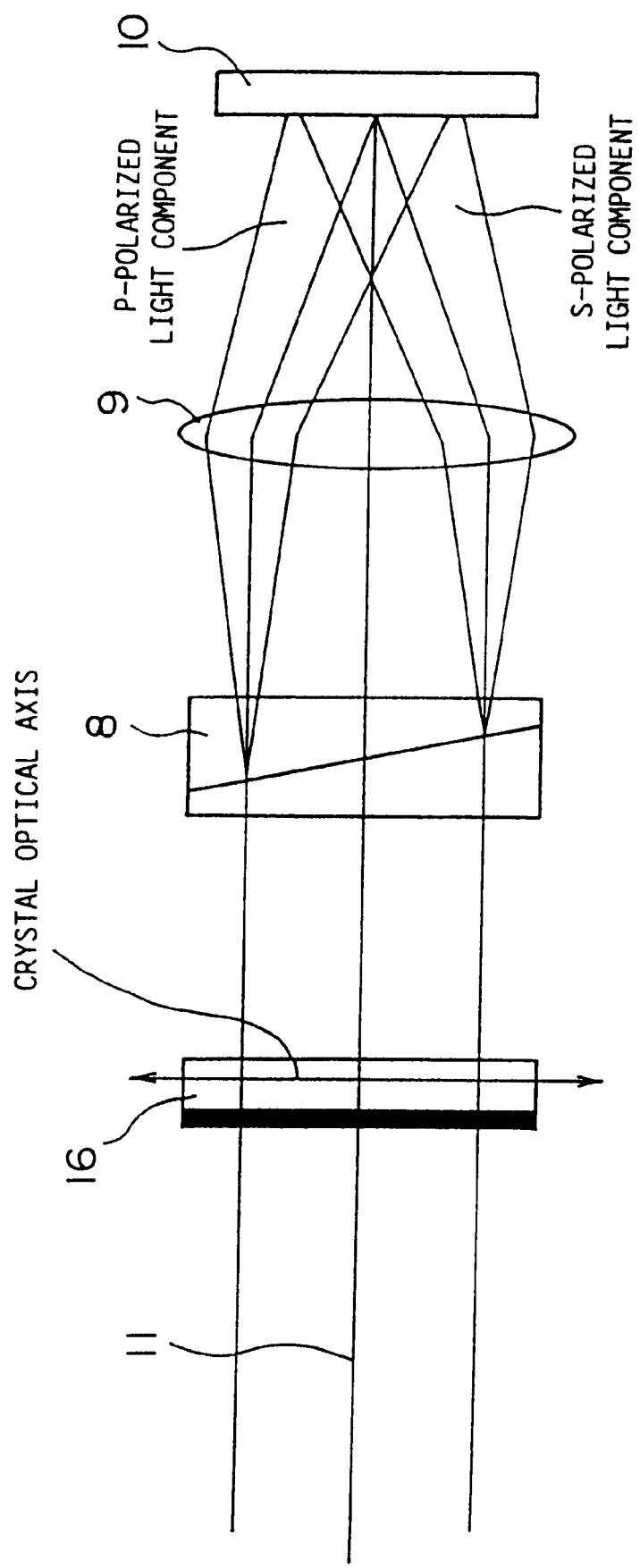
FIG. 10 is a diagram showing the important part of the second embodiment viewed from a direction perpendicular to the crystal optical axis.

Next, a description will be given of a second embodiment of the optical information storage unit according to the present invention, by referring to FIGS. 9 and 10. FIGS. 9 and 10 are diagrams on an enlarge scale respectively showing an optical system in a stage subsequent to a wave plate 16, and since an optical system in a stage prior to the wave plate 16 may be the same as the corresponding optical system shown in FIG. 2, an illustration and description thereof will be omitted.

FIG. 9 is a diagram viewed from a direction along the crystal optical axis of the wave plate 16. In addition, FIG. 10 is a diagram viewed from a direction perpendicular to the crystal optical axis of the wave plate 16. In FIGS. 9 and 10, those parts which are the same as those corresponding parts in FIGS. 2 through 4 are designated by the same reference numerals, and a description thereof will be omitted. In this embodiment, the wave plate 16 has the functions of both the diffraction grating 6 and the wave plate 7 of the first embodiment, and for this reason, the construction of the optical system can further be simplified and it is possible to make the optical information storage unit at an even lower cost as compared to the first embodiment.

A phase diffraction grating is provided on a surface of the wave plate 16 to which the bundle of rays from the polarization beam splitter 3 shown in FIG. 2 are incident, and each grating of the phase diffraction grating is arranged parallel to the crystal optical axis of the wave plate 16. Similarly as described above with respect to the first embodiment in conjunction with FIGS. 3 and 4, the bundle of rays is separated into the 0th order light and the ±1st order lights depending on the grating pitch of the phase diffraction grating of the wave plate 16. In addition, a desired phase error is introduced in each of the 0th order light and the ±1st order lights when the 0th order light and the ±1st order lights pass through the wave plate 16. The bundles of rays obtained via the wave plate 16 are converged on the photodetector 11 via the Wollaston prism 8 and the convergent lens 9, and the photoelectric conversion is carried out similarly to the first embodiment described above. As a result, this embodiment can reproduce from the land and the groove of the magneto-optic disk 5 a signal having the same signal quality as that obtainable in the first embodiment.

Therefore, according to the present invention, it is possible to easily obtain a reproduced signal having a high quality, even in a case where the signal is reproduced from a magneto-optic disk having a narrow track pitch. In addition, it is possible to obtain effects similar to the above in cases where the optical length of the groove of the magneto-optic disk is $\lambda/8$, $3\lambda/8$, $5\lambda/8$, . . . . Further, when realizing a magnetic super resolution (MSR) by employing the SIL technique, it is also possible to apply the present invention so as to obtain a reproduced signal which has a high quality and is suppressed of the effects of the crosstalk.

Further, the present invention is not limited to these embodiments, but various variations and modifications may be made without departing from the scope of the present invention.

What is claimed is:

1. An optical information storage unit for irradiating a light on a recording medium which has a recording surface with a land and a groove, and detecting a reproduced signal from a reflected light received from the recording medium, comprising:

a first optical element separating the reflected light received from the recording medium into at least three bundles of rays;

a second optical element compensating phases of the bundles of rays separated by said first optical element; and a third optical element separating polarization states of the bundles of rays separated by said first optical element;

an amount of phase compensation made by said second optical element being such that an absolute value of a difference between an amount of phase compensation required to reproduce a signal from the land and an amount of phase compensation required to reproduce a signal from the groove is greater than or equal to 60° but less than or equal to 180°.

2. The optical information storage unit as claimed in claim 1, which comprises a wave plate in place of said first and second optical elements, said wave plate having a phase diffraction grating with each of gratings arranged in a direction parallel to a crystal optical axis.

3. The optical information storage unit as claimed in claim 1, wherein said first optical element comprises a phase diffraction grating.

4. The optical information storage unit as claimed in claim 3, wherein said third optical element comprises a Wollaston prism, and a direction in which the bundles of rays are separated by said Wollaston prism is perpendicular to a direction in which the bundles of rays are separated by said diffraction grating.

5. The optical information storage unit as claimed in claim 4, which comprises a wave plate in place of said first and second optical elements, said wave plate having a phase diffraction grating with each of gratings arranged in a direction parallel to a crystal optical axis.

6. The optical information storage unit as claimed in claim 3, which further comprises:

signal detection means for detecting a magneto-optic signal using at least a 0th order light and ±1st order lights out of the bundles of rays separated by said diffraction grating.

7. The optical information storage unit as claimed in claim 6, wherein a sum of amounts of light of the ±1st order lights is approximately equal to an amount of light of the 0th order light.

8. The optical information storage unit as claimed in claim 6, wherein said signal detection means reproduces a signal from one of the land and the groove based on the 0th order light, and reproduces a signal from the other of the land and the groove based on the ±1st order light.

9. The optical information storage unit as claimed in claim 6, wherein said second optical element comprises a wave plate, and the 0th order light is incident approximately perpendicularly to said wave plate.

10. The optical information storage unit as claimed in claim 9, wherein said wave plate has a thickness for introducing a phase error $(N\cdot\lambda/2-C)$ in a bundle of rays, where C denotes an absolute value of an amount of phase compensation required to reproduce a signal from one of the land and the groove, $\lambda$ denotes a wavelength of the bundle of rays, and N is an integer greater than or equal to one.

11. The optical information storage unit as claimed in claim 9, wherein a crystal optical axis of said wave plate is parallel or perpendicular to a polarization plane of a bundle of rays of the reflected light which is unaffected by a Kerr effect.

12. The optical information storage unit as claimed in claim 11, wherein said wave plate has a thickness for introducing a phase error $(N\cdot\lambda/2 - C)$ in a bundle of rays, where C denotes an absolute value of an amount of phase compensation required to reproduce a signal from one of the land and the groove, $\lambda$ denotes a wavelength of the bundle of rays, and N is an integer greater than or equal to one.

* * * * *